(12) United States Patent
Fox et al.

(10) Patent No.: US 7,506,158 B2
(45) Date of Patent: *Mar. 17, 2009

(54) CERTIFICATE REISSUANCE FOR CHECKING THE STATUS OF A CERTIFICATE IN FINANCIAL TRANSACTIONS

(75) Inventors: Barbara L. Fox, Seattle, WA (US); Brian A. LaMacchia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/032,833

(22) Filed: Jan. 10, 2005

(65) Prior Publication Data

US 2005/0138363 A1 Jun. 23, 2005

Related U.S. Application Data

(63) Continuation of application No. 09/448,854, filed on Nov. 23, 1999, now Pat. No. 6,842,863.

(51) Int. Cl.
*H04L 9/32* (2006.01)
(52) U.S. Cl. ........................ 713/156; 713/175
(58) Field of Classification Search ................ 713/156, 713/175
See application file for complete search history.

(56) References Cited

U.S. PATENT DOCUMENTS

| 4,885,777 A | 12/1989 | Takaragi |
| 5,497,422 A | 3/1996 | Tysen |
| 5,560,008 A | 9/1996 | Johnson |
| 5,717,758 A | 2/1998 | Micall |
| 5,774,552 A | 6/1998 | Grimmer |
| 5,815,571 A | 9/1998 | Finley |
| 5,892,905 A | 4/1999 | Brandt |
| 5,903,882 A * | 5/1999 | Asay et al. ............... 705/44 |
| 5,915,087 A | 6/1999 | Hammond |
| 5,922,074 A | 7/1999 | Richard |
| 5,925,126 A | 7/1999 | Hsieh |
| 5,958,050 A | 9/1999 | Griffin |
| 5,960,084 A | 9/1999 | Angleo |
| 5,978,484 A | 11/1999 | Apperson |
| 5,987,608 A | 11/1999 | Roskind |

(Continued)

OTHER PUBLICATIONS

Blaze et al., "Decentralized Trust Management", IEEE, pp. 164-173 (1996).

(Continued)

*Primary Examiner*—Kambiz Zand
*Assistant Examiner*—Stephen Sanders
(74) *Attorney, Agent, or Firm*—Workman Nydegger

(57) ABSTRACT

A system for using a certificate authority to first provide a customer with a digital certificate, and then having a relying party that receives that digital certificate access a status authority (the certificate authority or its designated agent) to receive a reissued certificate on that certificate. The reissued certificate has a much shorter validity period, which ensures that the information is timely. Moreover, the certificate may serve as a receipt, including an accumulated record of the signatures (digital certificates) and policy applied throughout the financial transaction. As a result, each transfer of the transaction forms a digitally-signed chain of evidence recording each step of the transaction and policy applied thereto, whereby risk may be assumed and charged for appropriately and in accordance with the risk purchaser's policy.

14 Claims, 7 Drawing Sheets

U.S. PATENT DOCUMENTS

| | | | |
|---|---|---|---|
| 5,991,877 | A | 11/1999 | Luckenbaugh |
| 6,002,768 | A | 12/1999 | Albanese |
| 6,023,764 | A | 2/2000 | Curtis |
| 6,044,462 | A | 3/2000 | Zubeldia |
| 6,101,255 | A | 8/2000 | Harrison |
| 6,105,012 | A | 8/2000 | Chang |
| 6,105,134 | A | 8/2000 | Pinder |
| 6,108,788 | A | 8/2000 | Moses |
| 6,163,772 | A | 12/2000 | Kramer |
| 6,230,266 | B1 * | 5/2001 | Perlman et al. ............. 713/158 |
| 6,285,991 | B1 | 9/2001 | Powar |
| 6,532,540 | B1 | 3/2003 | Kocher |
| 6,564,319 | B1 | 5/2003 | Peters |
| 6,615,347 | B1 | 9/2003 | De Silva |
| 6,842,863 | B1 * | 1/2005 | Fox et al. ....................... 726/5 |
| 2001/0011255 | A1 * | 8/2001 | Asay et al. .................... 705/76 |

OTHER PUBLICATIONS

Chu et al., "Referee: Trust Management for Web Applications", Proceedings of the Sixth International World Wide Web Conference, pp. 227, 229-238 (Apr. 7-11, 1997).

Fox et al., "Certificate Revocation: Mechanics and Meaning", Financial Cryptography, Second International Conference, FC '98, pp. 158-164 (Feb. 23-25, 1998).

Housley et al., "Cryptographic Message Syntax" S/MIME Working Group, pp. 1-56 (Apr. 1999), http://www.ietf.org/internet-drafts/draft-ietf-smime-cms-13.txt Printed Apr. 27, 1999.

Housley et al., "Internet X.509 Public Key Infrastructure Certificate and CRL Profile", Public Key Infrastructure Working Group, RFC 2459, pp. 1-2, http://www.ieft.org/internet-drafts/draft-ietf-pkix-ipki-part-11.txt printed Apr. 26, 1999.

Kaliski, B., "PKCS #7: Cryptography Message Syntax", Version 1.5, Network Working Group Request for Comments: 2315, pp. 1-29 (Mar. 1998), http://info.internet/isi.edu/in-notes/rfc/files/rfc2315.txt printed Apr. 26, 1999.

Kaliski, B., "PKCS #10: Certification Request Syntax", Version 1.5, Network Working Group Request for Comments: 2314, pp. 1-8 (Mar. 1998), http://info.internet.isi.edu/in-notes/rfc/files/rfc2314.txt printed Apr. 26, 1999.

Kocher, Paul, "ValiCert-A Quick Introduction to Certificate Revocation Trees (CRTs)", Valicert, pp. 1-4, http://www.valcert.com/resources/bodyIntroRevocation.html printed Apr. 27, 1999.

Myers et al., "Internet X.509 Certificate Request Message Format", Public Key Infrastructure Working Group, RFC 2511, pp. 1-2. http://www.ietf.org/internet-drafts/draft-ietf-pkix-crmf-01.txt printed Apr. 27, 1999.

Myers et al., "X.509 Internet Public Key Infrastructure Online Certificate Status Protocol", PKIX Working Group, pp. 1-19 (Mar. 1999), http://www.ietf.org/internet-drafts/draft-ietf-pkix-oscp-08.txt printed Apr. 27, 1999.

* cited by examiner

CERTIFICATE REISSUANCE FOR CHECKING THE STATUS OF A CERTIFICATE IN FINANCIAL TRANSACTIONS

CROSS-REFERENCE TO RELATED APPLICATION

This is a continuation of U.S. patent application Ser. No. 09/448,854 filed Nov. 23, 1999.

FIELD OF THE INVENTION

The present invention generally relates to computer systems, and more particularly to transactions performed over a computer-based network such as intranets or the Internet.

BACKGROUND OF THE INVENTION

In network transactions, a certificate authority ("CA") is an entity that issues digitally signed certificates ("digital certificates") to other entities such as organizations or individuals to allow them to prove their identity to others in financial or other remote transactions. A certificate authority may be an external company such as one which offers digital certificate services, or may be an internal organization such as a corporate MIS department. The certificate authority's chief function is to ascertain whether a subscriber meets the policy criteria for a class of digital certificates and if so, to issue one. A "subscriber" could be a person, a machine, or an executable.

At present, for financial transactions, online customers obtain a digital certificate from a certificate authority or their bank, and send that digital certificate with a signed transaction request (e.g., purchase order) to a merchant. The merchant typically verifies the customer's signature using the public key in the certificate and in the process assures that the digital certificate's status is valid (e.g., not revoked). The X.509 standard (ISO/IEC JTC1/SC 21, Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions, 1 Dec. 1996) specifies that a way to determine the status of a digital certificate is by using a certificate revocation list ("CRL"). Each certificate authority (or its designated agent) publishes a CRL of digital certificates it has previously issued that are now revoked. The merchant downloads the CRL from the issuing certificate authority and searches the list to make sure that the serial number of the digital certificate in question is not on the list.

CRLs cause a variety of problems, one of which is that that the list of all revoked certificates from the certificate authority may potentially become very large. More importantly, a CRL may not be sufficiently current, (i.e. "fresh enough"), whereby reliance thereon creates unacceptable financial risk. This "freshness problem" is particularly dangerous in high-value transactions.

A merchant may also verify a digital certificate by utilizing an Online Certificate Status Checking Protocol ("OCSP"), a presently proposed standard by which the certificate authority or a verification company makes an independent assertion about a digital certificate's validity. With OCSP like other insurance schemes, financial risk is purposely assumed by the certificate authority or verification company in exchange for a per-transaction fee. The certificate authority or verification company determines if the digital certificate is revoked, and returns a good, revoked or unknown status.

While OCSP is thus potentially more up-to-date than CRL-based solutions, OCSP has a number of economically-motivated peculiarities and limitations that make it less than ideal for many transactions. For example, an OCSP response is essentially an up-to-date one-certificate CRL, returning only either the good, revoked or unknown assertion about a certificate in an entirely new message format. Moreover, OCSP presumes a particular risk management pricing model that attaches a high cost and high liability to the issuance of every certificate status assertion. As such, OCSP depends upon its own three-tier (Client-Certificate Authority-Designated Responder) infrastructure, wherein the number of qualified certificate issuers and designated status responders is highly limited. In typical financial transactions, however, acceptance policy is up to the policy of the party buying the risk, and there is no reason to limit the parties to transactions to the narrow OCSP model, let alone to the simplistic certificate status assertion of good, revoked or unknown.

SUMMARY OF THE INVENTION

The present invention is directed to a method and system for using a certificate authority to first provide a customer with a digital certificate, and then having a relying third party who receives that digital certificate from the customer access a status authority (the certificate authority or a designated agent of the certificate authority) to receive a second, reissued digital certificate on the first digital certificate or its public key. The reissued digital certificate has a relatively much shorter validity period than the first certificate, which relies on a certificate's expiring before its assertion could become false. The length of the validity period is determined by an associated risk management equation which includes, for example, the dollar amount of the transaction and the credit-worthiness of the customer.

Moreover, the reissued digital certificate serves as a receipt including an accumulated record of the signatures (digital certificates) and possibly other accumulated evidence throughout the financial transaction. As a result, the receipts generated on each transfer of a transaction adds to the digital chain of evidence, recording each step of the transaction and policy applied thereto, whereby risk may be assumed and charged for appropriately. The present invention is accomplished by simple extensions to existing protocols, i.e., without requiring new overly complex protocols and data structures, and further can return detailed information with each response.

Other advantages will become apparent from the following detailed description when taken in conjunction with the drawings, in which:

DETAILED DESCRIPTION

Exemplary Operating Environment

Figure 1:
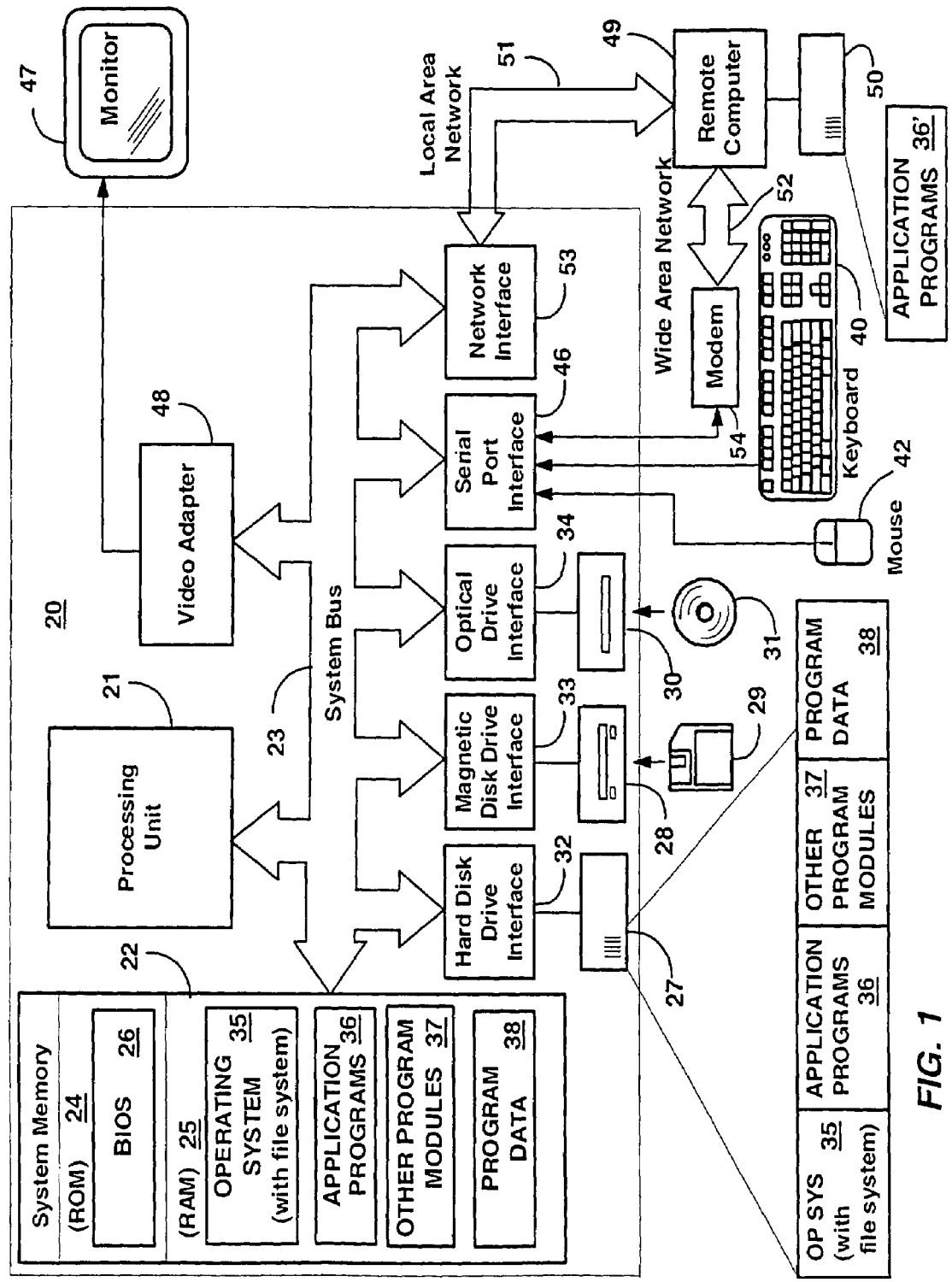
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMS) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Online Certificate Status Checking in Financial Transactions

While the present invention was originally implemented in a financial environment and thus includes financial-based client and server examples, it should be understood that the present invention is not limited to financial applications, but instead has numerous applications throughout user computing. Moreover, although the various components are shown and described herein as separate components because of certain benefits resulting from separated functionality, it can be readily appreciated that some or all of the components may be combined into more complex components, and/or separated even further into additional components.

Figure 2:
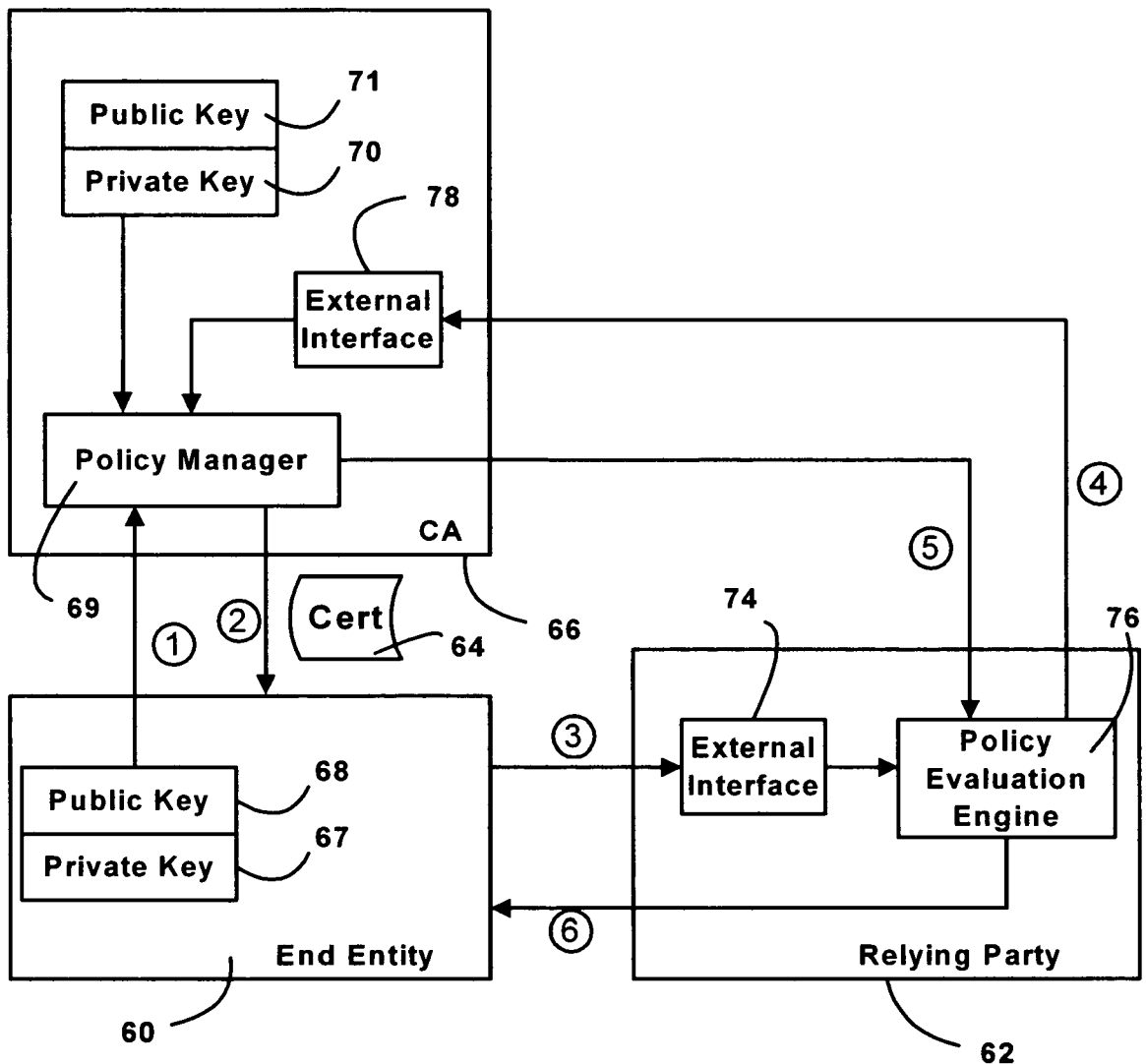
FIG. 2 is a block diagram representing a general architecture for performing a financial or other transaction over a network in accordance with one aspect of the present invention.

FIG. 2 shows a representation of a general architecture for performing a financial or other transaction over a network, such as the Internet, in accordance with the present invention. In the example shown, an online customer sends a request to a merchant to enter a particular transaction. The online customer in this example is an "end entity" 60 (the seller of the financial transaction), and the merchant is the "relying party" 62 (the buyer of the financial transaction).

In general, the present invention is directed to method and system by which the relying party 62 authenticates the end entity 60 so that a transaction can be entered. Initially, before the transaction can occur, the end entity 60 obtains a digital certificate 64 from a certificate authority 66 ("CA"), as represented in FIG. 2 by the arrows labeled with circled numerals one and two, respectively. More particularly, to request the original digital certificate 64, the end entity 60 generates a private key 67 and a public key 68 (or uses a pair previously generated) and submits a certification request to the certificate authority 66. This is represented in FIG. 2 by the arrow labeled with circled numeral one. The certificate authority 66 determines via a policy manager 69 if the request satisfies the certificate authority's certificate issuance policy and, if so, the certificate authority 66 processes the request by creating a digitally-signed statement including the public key 68 of the end-entity 60 and identity information about the end-entity 60. The resulting certificate 64 is a statement by the certificate authority 66 attesting to the binding between the identity information, and possession of both the private key 67 and the public key 68.

The certificate authority 66 uses a digital signature scheme (e.g., public key cryptography) to create a binding among some identity information, e.g., the end entity's possession of the private key 67 and the public key 68. The digital certificate 64 comprises a digitally-signed statement about the public/private key pair 68, 67, and is returned to the end entity 60 (the arrow numbered two in FIG. 2). The digital certificate 64 is signed using the certificate authority's private key 70 and can be verified by anyone holding a copy of the certificate authority's public key 71. All communications involve only the public key, and the private key is never transmitted or shared. While the present invention is described with reference to public key cryptography, it is understood that the features of the present invention may be utilized with any digital signature scheme or the like. The end entity 60 may use its private key 67 to electronically sign a transaction, and include the digital certificate 64 as evidence of its own identity i.e., authenticate that the end entity 60 is qualified to enter the transaction.

Figure 3:
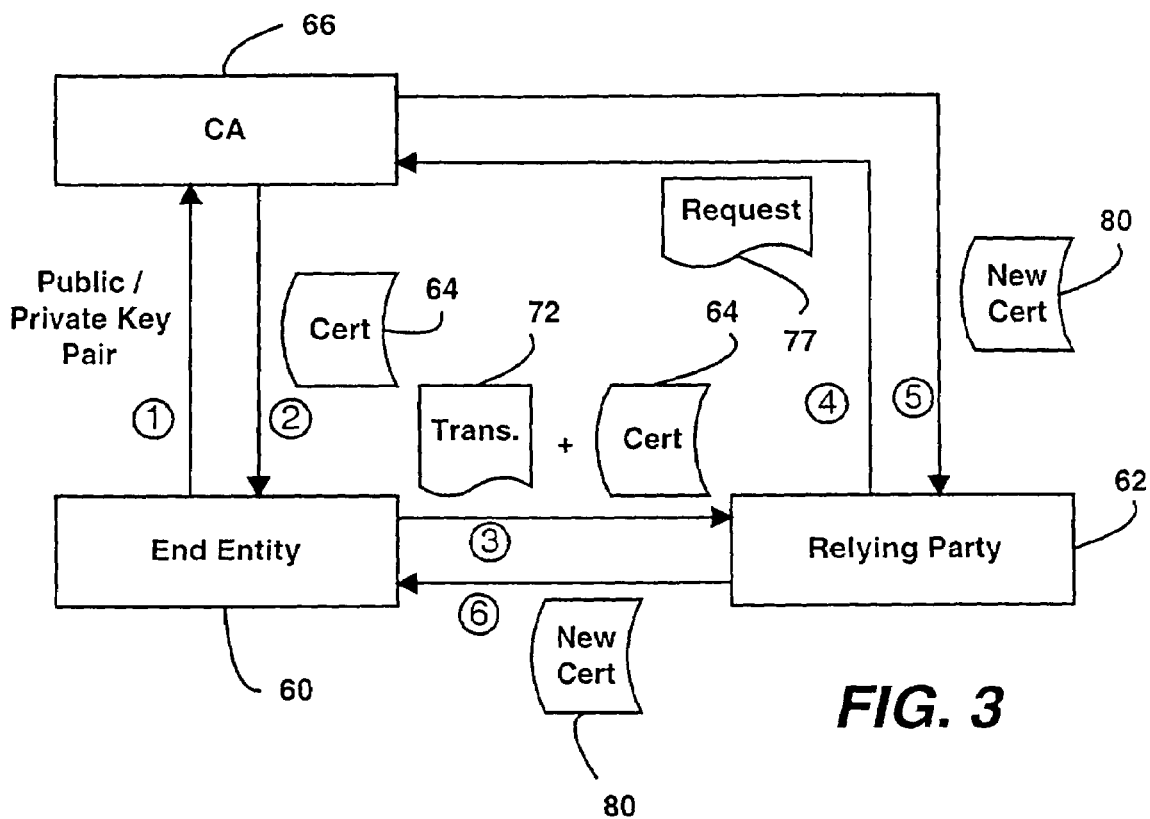
FIG. 3 is a block diagram representing a financial transaction performed in accordance with one aspect of the present invention.

As shown in FIGS. 2 and 3, to initiate a transaction, the end entity 60 sends (transmits as shown by the arrow labeled three) a transaction request 72 to the relying party 62 (e.g., merchant) along with the digital certificate 64 (FIG. 3). The digital certificate 64 and the transaction request 72 are received by the relying party's external interface 74 (FIG. 2), and are forwarded to a policy evaluation engine 76. The relying party's policy evaluation engine 76 makes a policy decision to determine whether the submitted evidence comprising the digital certificate 64 and possibly other information satisfies its own acceptance policy for the transaction. For transactions deemed "high-value" according to the relying party's policy, the relying party's policy evaluation engine 76 requires real-time proof that the end entity's public key 68 and/or the digital certificate 64 have not been revoked or otherwise compromised. Other information may be used and/or required by the policy evaluation engine 76, as described below.

In accordance with the present invention and as is described below, after receiving the digital certificate 64, to obtain real-time status information on the certificate 64, the relying party 62 accesses a status authority (i.e., the certificate authority 66 or a designated agent thereof) to receive a second, "reissued" digital certificate on the digital certificate 64. To request real-time status information regarding the digital certificate 64, the relying party's policy evaluation engine 76 requests, via a request message 77 (and the arrow labeled four in FIGS. 2 and 3), a status inquiry from the certificate authority 66. The request message 77 may seek the status of the digital certificate 64, and/or the status of the underlying public key 68.

As shown in FIG. 2, the certificate authority 66 receives the request at an external interface 78. Although the status request message 77 is depicted in FIG. 3 as being sent directly to the issuing certificate authority 66 as the status authority, in practice the request may be directed to an agent authorized to emit status information on behalf of the issuing certificate authority. The certificate authority 66 shown in the drawings thus also represents the status authority, including any such agent, although not separately shown for purposes of simplicity.

The request message 77 may comprise the digital certificate 64, and/or any other prior issued digital certificate or certificates that were submitted by the end entity 60 to the relying party 62. For example, if the relying party wants current information regarding the status of the digital certificate 64, the message delivered to the responder may be exactly the digital certificate 64.

The digital certificate 64 may also be submitted to the certificate authority 66 as the request message 77 for information regarding the status of the public key 68. Some additional information may be added to the digital certificate 64 (e.g., header information) to indicate that a response about the public key 68 is desired, and not a response about the digital certificate 64 carrying the public key.

The public key 68 may also be extracted from the digital certificate 64, and forwarded to the certificate authority as the request message 77 for real-time status of the public key. However, if such a method is used, the request message may need to be distinguished from a request for an original certificate.

The request message 77 may take a variety of different formats, including the formats and protocols of existing industry standards. Slight variations may be required to use some of the existing protocols. For example, the de facto industry standard for requesting a digital certificate for a public/private key pair is defined by a protocol known as the PKCS #10 protocol. PKCS #10 messages are self-signed to provide proof-of-possession of the corresponding private key. In the case of real-time status checking, the requesting party (i.e., the relying party 62) is not normally the same entity as that possessing the key pair in question, and thus does not possess the private key. Thus, if PKCS #10 message format is to be used, the certificate authority 66 is altered so as to receive a public key, an existing digital certificate, or both of these items with additional information. For example, the request could be slightly altered so as to distinguish the request from a standard PKCS #10 message by adding header information or the like identifying the request as a real-time status inquiry of an existing digital certificate or public key.

The request message 77 could also utilize the existing extensibility in the proposed CMS (Cryptographic Message Syntax)-based certificate enrollment protocol known as CMC. In CMC, the Full Enrollment Request message is a signed CMS with commands (zero or more) and enrollment requests (zero or more). The certificates to be checked could be included the CertificateSet portion of a SignedData CMS content payload. That is, the body of the CMS SignedData message becomes simply a data structure of the form:

```
SEQUENCE OF
    SEQUENCE {
        id-realtime-status-request    // an OBJECT IDENTIFIER
        requestSubject                // a ResponseSubject
    }
}
``` where ResponseSubject is an extension that is added to a digital certificate to create a reissue certificate (described below), and the request for the ResponseSubject, as indicated by "requestSubject", is an indication that a reissue certificate is requested. The ResponseSubject request provides a reference either to a particular public/private key pair (by referencing the key identifier of a public key), or to a particular certificate, either by a hash of the certificate or by an (issuer name, serial number) pair. The type of request being made, i.e., public key versus certificate, is implicit in the choice of identifier.

In response to the request message 77, the status authority (e.g., the certificate authority 66 via the policy manager 69) issues a "reissue" digital certificate 80 (FIG. 3), attesting to the current validity of the subject certificate. The reissue digital certificate 80 is distinct from the certificate 64, and can be provided in a variety of formats, but preferably is provided in the existing X.509v3 protocol format. By using an existing standard as opposed to creating a new message type, existing public key infrastructure ("PKI") clients and certificate servers require only minimal modifications to take advantage of the present invention.

Figure 4:
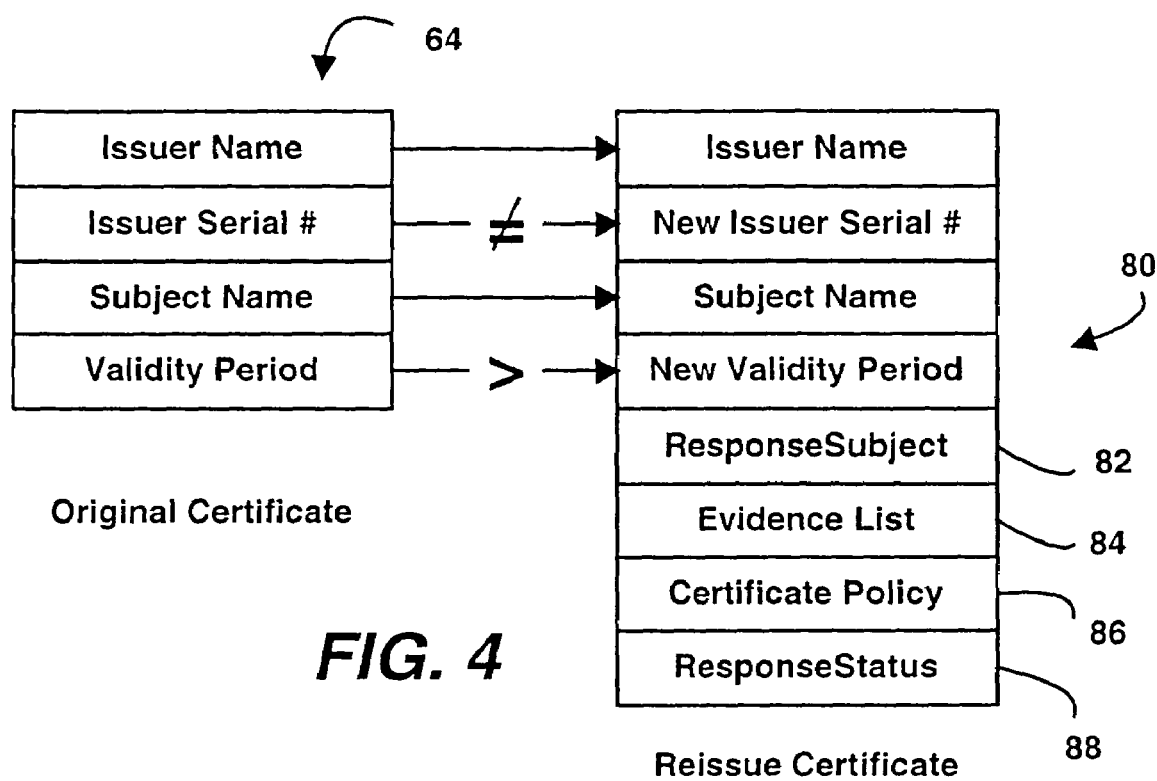
FIG. 4 is a block diagram representing a data structure of selected various fields of a reissue certificate formed in accordance with one aspect of the present invention.

An example of the differences between selected various fields of the reissue certificate 80 and the certificate 64 are shown in FIG. 4. As can be seen, the reissue digital certificate 80 takes much of the same form as the original certificate, and includes the same Issuer Name and Subject Name. The reissue digital certificate 80 includes an Issuer Serial Number, different than the Serial Number of the original digital certificate 64, that uniquely identifies the reissue digital certificate 80. The validity period of the reissue digital certificate 80 is narrowed to the window in which the reissue digital certificate is valid. This period may be set to a desired age, and is likely to be significantly shorter than the validity period of the original digital certificate 64 and, for many transactions, may be less than one day in duration.

In a preferred embodiment, the certificate authority adds to the original digital certificate 64 a new extension 82 indicating that it is a freshness assertion about a public key or a digital certificate. The presence of the extension 82 (which is identified by its own "object identifier" (OID)) can serve as notice that the reissue certificate 80 is a response to a status check. The data contained in the extension 82, called ResponseSubject in the example shown in FIG. 4, references the object for which status was requested: a public key or a certificate. One way to do this is to use a modified form of the AuthorityKeyIdentifier data type defined in Public Key Infrastructure Exchange (PKIX) Part 1, Section 4.2.1.1:

```
ResponseSubject ::= SEQUENCE {
    keyIdentifier        [0] KeyIdentifier           OPTIONAL,
    certIdentifier       [1] CertIdentifier          OPTIONAL,
    certIssuer           [2] GeneralNames            OPTIONAL,
    certSerialNumber     [3] CertificateSerialNumber OPTIONAL,
}
KeyIdentifier ::= OCTET STRING
CertIdentifier ::= SEQUENCE  {
    hashAlgorithm        AlgorithmIdentifier,
    certHash             CertHash
}
CertHash ::= OCTET STRING
```

As can be seen in the above example, a ResponseSubject extension 82 may include a reference to a particular public key (denoted by keyIdentifier), a reference to a particular digital certificate via hash (certIdentifier), and/or a reference to an issuer/serial-number pair (certIssuer, certSerialNumber). Since the keyIdentifier is presumed to correspond to a SubjectKeyIdentifier contained within the digital certificate 64, there is no need to identify a hash algorithm for it. For the CertIdentifier structure, a certificate hash (algorithm and hash function output) is needed to uniquely identify the digital certificate that is the subject of the response.

In the case of a failure, i.e., rejection, the certificate authority 66 may fail to return a response, although this is not particularly desirable or useful to the relying party 62. Alternatively, the certificate authority 66 may return some other signed statement including information concerning why the status check failed. Another possibility is to add another extension 84 (called "ResponseStatus" in FIG. 4) to the reissue digital certificate 80 that explicitly contains success/failure information. The relying party's policy evaluation engine 76 could check such explicit information as part of its evaluation of the reissue digital certificate 80.

The certificate authority 66 may choose to add other extensions to the reissue digital certificate 80 as evidence that its policy has been met. For example, an Evidence List extension 84 could be added that contains information regarding the evidence submitted to satisfy the policy of the relying party 62. Additionally, a Certificate Policy extension 86 could be added that includes policy-related information that semantically qualifies the response. Additional extensions could be added to provide desired information with the reissue digital certificate 80.

The reissue certificate 80 is forwarded to the relying party's policy evaluation engine 76, and is combined with the transaction request 72, the digital certificate 64 and any other submitted evidence to make a determination if the information meets the relying party's trust management question. The policy evaluation may include only the above-described real-time status check on the submitted certificate or the underlying public key (FIG. 3), but may further additional local inquiries, such as an application-specific real-time check (e.g., communication with a bank to determine current credit-worthiness), and/or an evaluation of locally-held policy-related information, such as the relying party's prior transaction history with this particular end entity 60.

Figure 5:
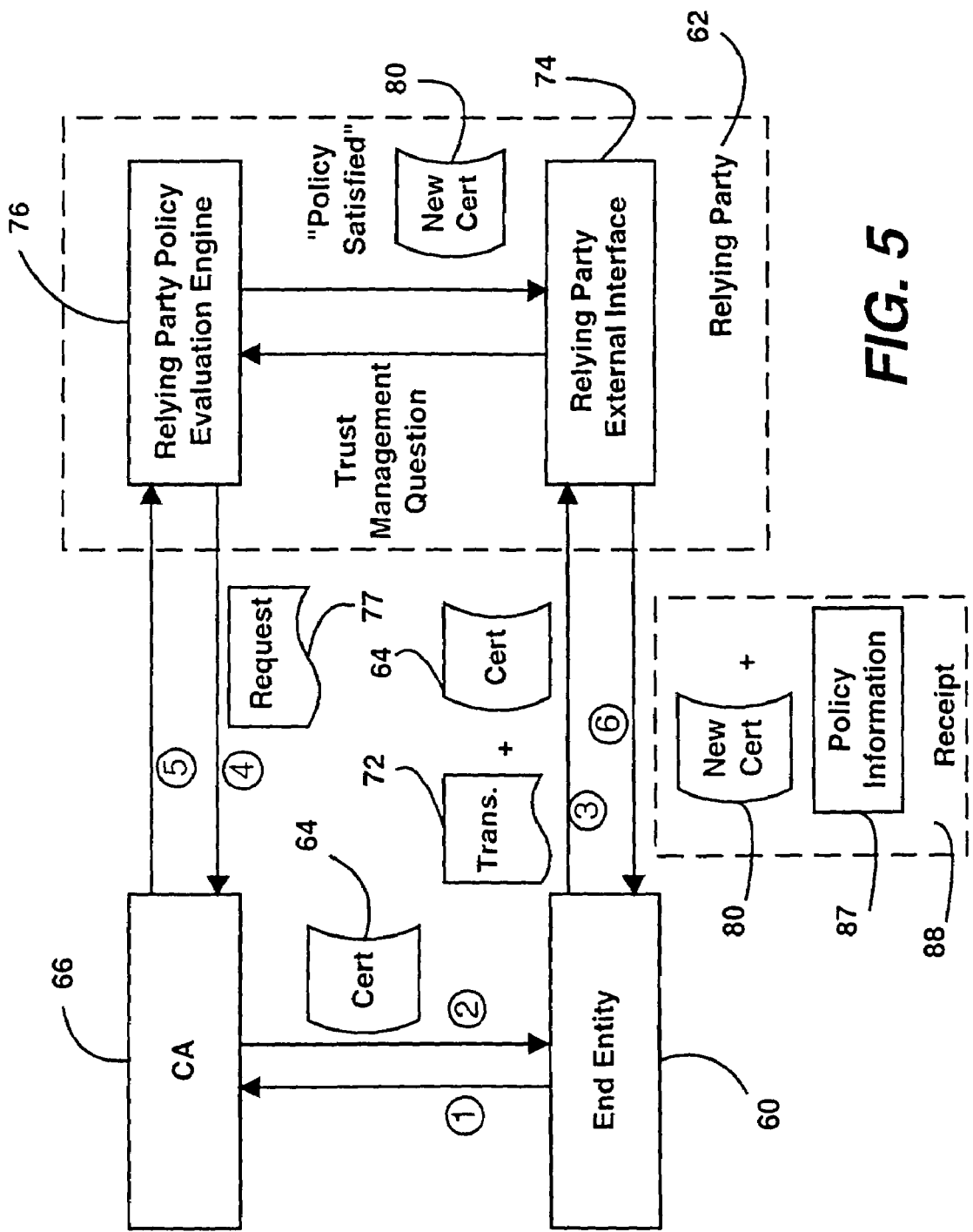
FIG. 5 is a block diagram representing a financial transaction performed in accordance with an aspect of the present invention.

FIG. 5 shows a financial transaction in which additional local inquiries, other than the status of a public key and/or a digital certificate, may be required by the policy evaluation engine 76. The additional policy information may be requested in the request message 77 and evaluated by the certificate authority 66, or may be determined independent of the certificate authority. If determined by the certificate authority 66, the information is added to the reissue certificate 80. If determined by the relying party, digitally signed signatures 87 or the like regarding the locally determined policy information may be generated and combined with the reissue digital certificate 80 or, alternatively, the relying party may issue another reissue certificate incorporating the new information.

Following the policy evaluation, the relying party's policy evaluation engine 76 generates an acceptance or denial result, and a statement of the decision is returned to the end entity 60, along with the digital reissue certificate 80 and digitally signed signatures 87, if any. This is shown in FIGS. 2, 3 and 5 by the arrow labeled with circled numeral six. In the case of acceptance, the reissue digital certificate 80 and local policy digital signatures 87, (if any), are forwarded to the end entity 60 as a receipt 88 (FIG. 5). The end entity 60 is thus supplied with information regarding the policy applied to the transaction.

After issuing the receipt 88, the relying party 62 may wish to re-sell the transaction to a third party. The buyer in the previous transaction (the relying party 62) then becomes the seller of the transaction, and the previously-issued receipt is now a piece of evidence submitted to the new buyer proving that the old buyer (i.e., the relying party 62) applied its own policy at the time it purchased the transaction. The new buyer of the transaction may then request a new reissue certificate and produce a new receipt, and can sell the transaction to a new party, and so on.

Figure 6:
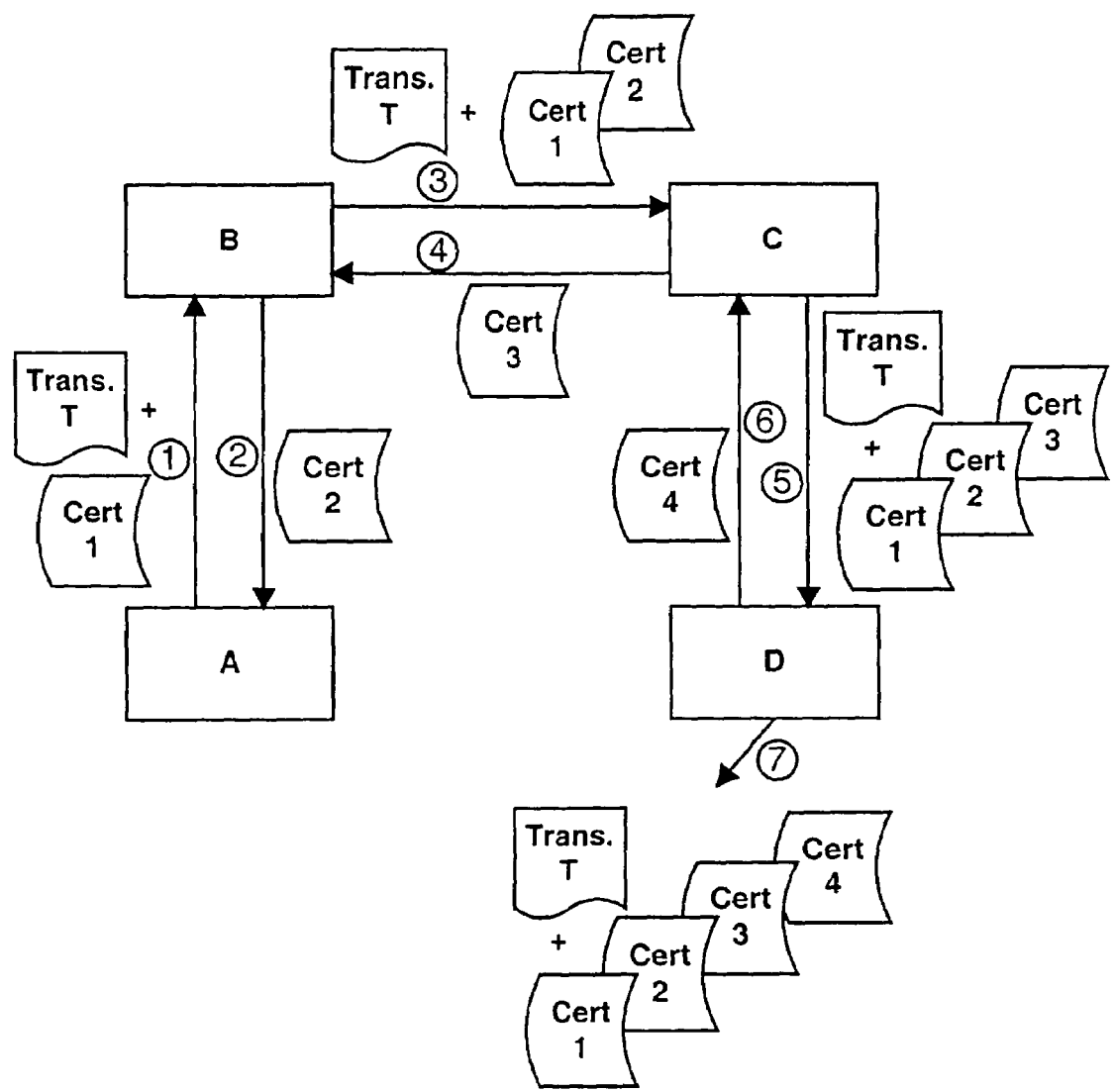
FIG. 6 is a block diagram representing a series of financial transactions performed in accordance with one aspect of the present invention.

For example, FIG. 6 illustrates how accumulated signed receipts, generated as part of the process of selling and re-selling a single transaction, encapsulate the transaction's history. Initially, party A holds transaction T and receipt/certificate Cert$_1$, which describes how party A came to hold the transaction. Party A proposes to sell the transaction T to party B and sends party B the transaction T along with the receipt/certificate Cert$_1$ and other supporting evidence, if necessary. Party B evaluates the evidence to see that it satisfies its policy and if so, issues a receipt/certificate ("Cert$_2$") as proof that its policy was satisfied. The new receipt/certificate Cert$_2$ is returned to party A and the transaction between party A and party B concludes. Party B now holds transaction T, receipt/certificate Cert$_1$ (which references T) and receipt/certificate Cert$_2$ (which references both transaction T and Cert$_1$).

Party B may then re-sell the transaction T to party C. As above, party B first sends the transaction T to the proposed buyer along with supporting evidence. The evidence submitted by B will ordinarily include both the evidence submitted by party A to party B when party B bought the transaction T, as well as the receipt/certificate Cert$_2$ that party B issued showing that party B's acceptance policy was satisfied. Party C performs its own acceptance policy evaluation and issues receipt/certificate Cert$_3$ as proof of acceptance of the transaction. This new receipt/certificate Cert$_3$, which references the transaction T and receipt/certificates Cert$_1$ and Cert$_2$, is returned to party B to complete the resale of the transaction. A further resale in a similar manner of the transaction T from party C to party D is shown in FIG. 6, resulting in party D issuing a receipt/certificate Cert$_4$.

At the conclusion of the three sales of the transaction T, party D holds the transaction T and four receipt/certificates—Cert$_1$, Cert$_2$, Cert$_3$ and Cert$_4$. Together, these receipt/certificates detail exactly how transaction T moved among the four parties, what policy decisions were made along the way, and the commitments made by each party in the process. Even after the transaction terminates and no longer exists, the receipts persist and continue to provide evidence. For example, should the transaction T be repudiated at a later date, the signed receipt/certificates may be used to prove or refute a claim. Thus, the set of receipts/certificates generated by every transfer of the transaction forms a digitally-signed chain of evidence binding not only every step of the transaction but also every policy application that happened along the way. Of course, it is feasible to include less information than the total accumulated with each additional transaction.

Figure 7:
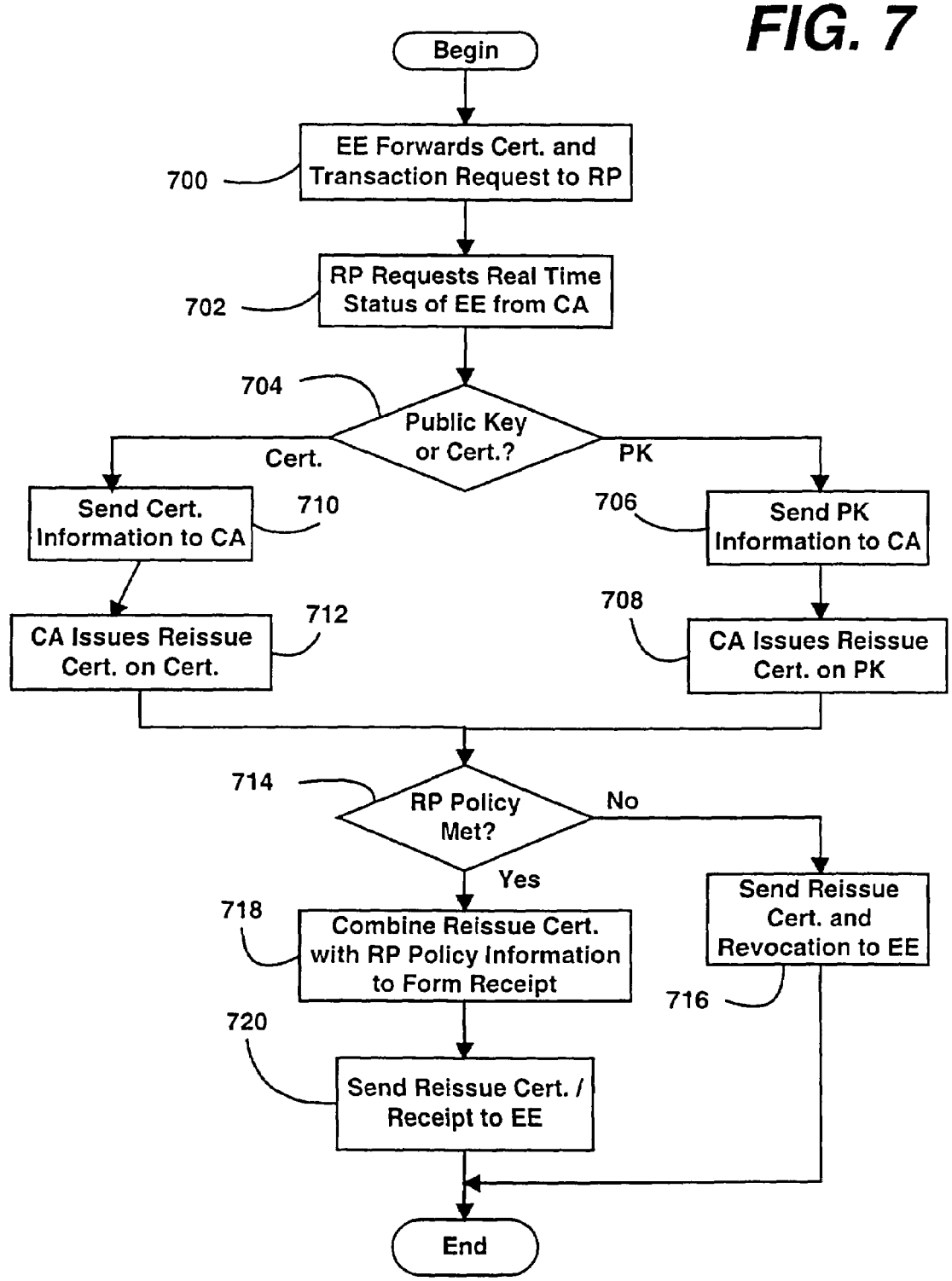
FIG. 7 is a flow diagram generally representing the steps for issuing a reissue digital certificate upon an existing digital certificate in accordance with one aspect of the present invention.

Turning now to an explanation of the operation of the present invention, FIG. 7 shows a general overview of a process for issuing a reissue certificate in accordance with one aspect of the present invention. Beginning at step 700, the end entity 60 ("EE"), already possessing a digital certificate 64 ("Cert.") from the certificate authority 66, forwards the digital certificate, along with a transaction request 72, to the relying party 62 ("RP"). The relying party 62 requests real-time status information regarding the end entity 60 (step 702).

As described above, the real-time status inquiry may be regarding the status of the digital certificate 64, or the status of the underlying public key 68 for the digital certificate. If information regarding the status of the public key 68 is desired, step 704 branches to step 706, where the relying party 62 sends information identifying the public key ("PK") to the status authority (e.g., the certificate authority 66). As also described above, this information may be, for example, the extracted public key 68, the digital certificate 64 with additional information indicating that a status request regarding the public key is desired, or a command requesting the public key information by hash. At step 708, the certificate authority 66 issues a reissue certificate on the public key 68.

Alternatively, if information regarding the digital certificate 64 is desired, step 704 branches to step 710 where the relying party 62 sends information identifying the digital certificate 64 to the status authority (e.g., the certificate authority 66). As described above, this information may include, for example, the digital certificate 64, the issuer name and serial number for the digital certificate, or other sufficient information to identify the digital certificate 64. The certificate authority 66 issues a reissue certificate (e.g., the reissue certificate 80) on the digital certificate 64.

At step 714, a determination is made, for example by the relying party's policy evaluation engine 76, as to whether the relying party's policy is met. As described above, this inquiry may include only the real-time status check of the digital certificate 64, or may additionally include local inquiries regarding the transaction or the end entity 60. If the relying party's policy is not met, step 714 branches to step 716 where the reissue certificate ("RC") and a message informing the end entity 60 of the rejection of the requested transaction is forwarded to the end entity.

If, however, the relying party's policy is met, step 714 branches to step 718 where the reissue certificate 80 and relying party policy information are combined to form a receipt. The receipt is forwarded to the end entity 60 in step 720.

As can be seen from the above detailed description, there is provided a system and method for certificate re-issuance to validate a transaction. The system and method may be accomplished via extensions to existing protocols, and further allow receipts including policy information to be generated with each transaction. The present invention may be implemented independent of the underlying form of public key infrastructure, and without reliance on a limited number of qualified certificate issuers and designated status responders. With the present invention, response to a real-time status check is a risk transference just like certificate issuance.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a networking environment in which an end entity such as a customer desires to enter into an electronic transaction with a relying party such as a merchant, a computer-readable medium having computer-executable instructions for implementing at one or more operating environments of the network a method for permitting the relying party to check the status of a certificate of authority previously issued by a certificate authority to the end entity before the relying party enters into the desired electronic transaction requested by the end entity, the method comprising:

receiving at a relying party's computing system a first transaction request sent from the end entity's computing system, the first transaction request being associated with a first certificate previously issued by a certificate authority's computing system, the first certificate having a representation of an issuer name associated with the certificate authority and a subject name associated with the end entity;

the relying party thereafter communicating with either the certificate authority or an agent of the certificate authority to query for current status information on the first certificate; and in response to the query, receiving at the relying party's computing system a second certificate from either the certificate authority or the certificate authority's agent, the second certificate indicating the current status of the first certificate, and the second certificate having a representation of an issuer name that is associated with either the certificate authority or the certificate authority's agent, and the subject name associated with the end entity.

2. The computer-readable medium of claim 1, wherein the method further comprises transmitting from the relying party back to the end entity a transaction receipt comprising information that includes the second certificate.

3. The computer-readable medium of claim 2, wherein the information including the second certificate is transmitted to the end entity along with a response to the first transaction request.

4. The computer-readable medium of claim 2, wherein the information including the second certificate is transmitted to the end entity along with at least one digital signature.

5. The computer-readable medium of claim 1, wherein the method further comprises transmitting the first certificate and the second certificate to a new relying party along with a second transaction request.

6. In a networking environment in which and end entity such as a customer desires to enter into an electronic transaction with a relying party such as a merchant, a computer-readable medium having computer-executable instructions for implementing at one or more operating environments of the network a method for permitting the relying party to check the status of a certificate of authority previously issued by a certificate authority to the end entity before the relying party enters into the desired electronic transaction requested by the end entity, the method comprising:

receiving at a computing system for the certificate authority or an agent of the certificate authority a query from a relying party's computing system for current status information on a first certificate previously issued by the certificate authority to an end entity, the first certificate having a representation of an issuer name associated with the certificate authority and a subject name associated with the end entity; and in response to the query, issuing from the certificate authority or the certificate authority's agent a second certificate to the relying party indicating the current status of the first certificate, and the second certificate having a representation of an issuer name that is associated with either the certificate authority or the certificate authority's agent, and the subject name associated with the end entity.

7. The computer-readable medium of claim 6, wherein the second certificate comprises one or more data fields, one of which is a field for designating the second certificate as being an indication of the current status of the first certificate.

8. The computer-readable medium of claim 7, wherein the second certificate further comprises a data field for containing policy information.

9. The computer-readable medium of claim 8, wherein the second certificate further includes a data field for containing information regarding evidence submitted to satisfy a policy of the relying party.

10. The computer-readable medium of claim 6, wherein the second certificate comprises one or more data fields, one of which contains policy-related information that qualifies the second certificate.

11. The computer-readable medium of claim 6, wherein the second certificate comprises one or more data fields, one of which contains success or failure information regarding the second certificate.

12. The computer-readable medium of claim 6, wherein the second certificate comprises one or more data fields, one of which contains information regarding a validity period of the second certificate.

13. In a networking environment in which an end entity such as a customer desires to enter into an electronic transaction with a relying party such as a merchant, a method for permitting the relying party to check the status of a certificate of authority previously issued by a certificate authority to the end entity before the relying party enters into the desired electronic transaction requested by the end entity, the method comprising:

receiving at a relying party's computing system a first transaction request sent from the end entity's computing system, the first transaction request being associated with a first certificate previously issued by a certificate authority's computing system, the first certificate having a representation of an issuer name associated with the certificate authority and a subject name associated with the end entity;

the relying party thereafter communicating with either the certificate authority or an agent of the certificate authority to query for current status information on the first certificate; and in response to the query, receiving at the relying party's computing system a second certificate from either the certificate authority or the certificate authority's agent, the second certificate indicating the current status of the first certificate, and the second certificate having a representation of an issuer name that is associated with either the certificate authority or the certificate authority's agent, and the subject name associated with the end entity.

14. In a networking environment in which and end entity such as a customer desires to enter into an electronic transaction with a relying party such as a merchant, a method for permitting the relying party to check the status of a certificate of authority previously issued by a certificate authority to the end entity before the relying party enters into the desired electronic transaction requested by the end entity, the method comprising:

receiving at a computing system for the certificate authority or an agent of the certificate authority a query from a relying party's computing system for current status information on a first certificate previously issued by the certificate authority to an end entity, the first certificate having a representation of an issuer name associated with the certificate authority and a subject name associated with the end entity; and in response to the query, issuing from the certificate authority or the certificate authority's agent a second certificate to the relying party indicating the current status of the first certificate, and the second certificate having a representation of an issuer name that is associated with either the certificate authority or the certificate authority's agent, and the subject name associated with the end entity.

* * * * *